United States Patent
West et al.

(10) Patent No.: US 10,564,256 B2
(45) Date of Patent: Feb. 18, 2020

(54) BEAM SHARPENING RADAR SYSTEM AND METHOD

(71) Applicant: Rockwell Collins, Inc., Cedar Rapids, IA (US)

(72) Inventors: James B. West, Cedar Rapids, IA (US); Daniel L. Woodell, Holts Summit, MO (US); Richard D. Jinkins, Rewey, WI (US); Richard M. Rademaker, Cedar Rapids, IA (US); Robert D. Pond, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 366 days.

(21) Appl. No.: 15/089,254

(22) Filed: Apr. 1, 2016

(65) Prior Publication Data
US 2017/0285137 A1    Oct. 5, 2017

(51) Int. Cl.
*G01S 7/282* (2006.01)
*G01S 13/95* (2006.01)
*H01Q 1/28* (2006.01)
*H01Q 3/36* (2006.01)

(52) U.S. Cl.
CPC ............ *G01S 7/282* (2013.01); *G01S 13/953* (2013.01); *H01Q 1/281* (2013.01); *H01Q 3/36* (2013.01)

(58) Field of Classification Search
CPC ........ G01S 7/282; G01S 13/953; G01S 13/94; G01S 7/4026; G01S 13/48; G01S 7/003; G01S 13/882; G01S 13/68; G01S 13/426; G01S 7/2813; G01S 7/24; G01S 13/42;
(Continued)

(56) References Cited

U.S. PATENT DOCUMENTS 4,025,763 A * 5/1977 Kleiss .................. G05B 6/02
                                                  700/43
4,041,487 A * 8/1977 Evans .................. G01S 13/68
                                                  342/91
(Continued)

FOREIGN PATENT DOCUMENTS

CN          101825707         9/2010

OTHER PUBLICATIONS

First Office Action for Chinese Patent Application No. 201710073359.5 dated Dec. 24, 2019. 13 pages.

*Primary Examiner* — Timothy A Brainard
*Assistant Examiner* — Nuzhat Pervin
(74) *Attorney, Agent, or Firm* — Donna P. Suchy; Daniel M. Barbieri

(57) ABSTRACT

A radar system, such as a weather radar system, includes a radar antenna and a processor. The processor is configured to cause a first radar beam to be provided using a first portion of the radar antenna. The processor is configured to cause a second radar beam to be provided using a phase adjusted portion of the antenna and a remaining portion of the radar antenna. A radar method and system can allow multiple low-loss overlapping radar beams to be rapidly generated to support a sequential lobbing process which may be used to generate intra-beam target angle estimates. The production of these overlapping beams does not require mechanical antenna movement but beam selection is controlled by a simple electronic switch in some embodiments.

20 Claims, 6 Drawing Sheets

(58) Field of Classification Search
CPC .......... G01S 13/91; H01Q 1/281; H01Q 3/36; H01Q 21/005
USPC ...................................................... 342/26 B
See application file for complete search history.

(56) References Cited

U.S. PATENT DOCUMENTS

| | | | | |
|---|---|---|---|---|
| 4,359,742 A * | 11/1982 | Smith | ................... | H01Q 21/005 343/768 |
| 4,536,766 A * | 8/1985 | Frazita | ..................... | H01Q 3/36 342/372 |
| 4,649,390 A * | 3/1987 | Andrews | ............... | G01S 13/426 342/140 |
| 5,241,318 A * | 8/1993 | Howard | ................ | G01S 13/426 342/149 |
| 5,600,326 A * | 2/1997 | Yu | ......................... | G01S 7/2813 342/149 |
| 5,663,720 A * | 9/1997 | Weissman | ............... | G01S 13/91 340/905 |
| 5,696,579 A * | 12/1997 | Johnson | ............. | G01D 5/35383 356/35.5 |
| 6,377,204 B1 * | 4/2002 | Wurman | ............... | G01S 13/003 342/59 |
| 6,741,208 B1 | 5/2004 | West et al. | | |
| 6,747,593 B1 * | 6/2004 | Jaffer | .................... | G01S 13/003 342/160 |
| 6,768,456 B1 * | 7/2004 | Lalezari | ................ | G01S 13/48 342/373 |
| 6,771,218 B1 * | 8/2004 | Lalezari | ................ | G01S 13/48 342/373 |
| 7,616,150 B1 | 11/2009 | Woodell | | |
| 7,843,380 B1 * | 11/2010 | Woodell | ................ | G01S 7/2813 342/120 |
| 7,864,103 B2 * | 1/2011 | Weber | ..................... | G01S 7/003 342/118 |
| 7,889,117 B1 * | 2/2011 | Woodell | ................... | G01S 13/94 342/148 |
| 7,965,225 B1 * | 6/2011 | Dickerson | ............. | G01S 7/4026 342/73 |
| 8,077,091 B1 * | 12/2011 | Guigne | ................. | G01S 5/0215 342/442 |
| 8,134,491 B1 * | 3/2012 | Meyer | ...................... | G01S 7/24 342/65 |
| 8,489,666 B1 * | 7/2013 | Nikitin | ................. | G06G 7/1928 708/819 |
| 8,558,731 B1 * | 10/2013 | Woodell | ................... | G01S 13/94 342/118 |
| 8,643,533 B1 * | 2/2014 | Woodell | ................ | G01S 13/953 342/118 |
| 8,698,669 B1 * | 4/2014 | Woodell | ................ | G01S 13/882 340/945 |
| 8,773,301 B1 * | 7/2014 | Woodell | ................... | G01S 13/94 342/118 |
| 8,933,836 B1 * | 1/2015 | Woodell | ................ | G01S 7/4026 342/149 |
| 9,000,972 B1 * | 4/2015 | Cahoon | ................... | G01S 13/95 342/26 B |
| 9,116,244 B1 * | 8/2015 | West | ..................... | G01S 13/953 |
| 9,420,958 B2 * | 8/2016 | Fung | ..................... | A61B 5/024 |
| 2003/0120485 A1 * | 6/2003 | Murase | ............... | G10L 21/0208 704/228 |
| 2004/0263387 A1 * | 12/2004 | Lalezari | ................ | G01S 13/48 342/373 |
| 2005/0006341 A1 * | 1/2005 | Frum | ................ | H01J 37/32935 216/59 |
| 2005/0012655 A1 * | 1/2005 | Lalezari | ................ | G01S 13/48 342/62 |
| 2007/0022803 A1 * | 2/2007 | DiFoggio | ................ | E21B 49/10 73/64.53 |
| 2007/0129901 A1 * | 6/2007 | DiFoggio | ................ | E21B 49/10 702/54 |
| 2008/0266171 A1 * | 10/2008 | Weber | ..................... | G01S 7/003 342/123 |
| 2009/0167605 A1 * | 7/2009 | Haskell | .................. | H01Q 3/36 342/372 |
| 2009/0292474 A1 * | 11/2009 | DiFoggio | ............. | E21B 47/101 702/13 |
| 2011/0181455 A1 * | 7/2011 | Vanuytven | ............ | G01S 7/2813 342/27 |
| 2013/0131879 A1 * | 5/2013 | Andresen | ................ | H02J 3/386 700/287 |
| 2013/0258312 A1 * | 10/2013 | Lewis | ..................... | G01S 17/10 356/4.01 |
| 2013/0339418 A1 * | 12/2013 | Nikitin | ................... | G01R 29/02 708/819 |
| 2014/0195577 A1 * | 7/2014 | Nikitin | ................. | H03H 7/0153 708/304 |
| 2016/0054439 A1 * | 2/2016 | Brookner | ................ | G01S 13/42 342/26 R |
| 2016/0354063 A1 * | 12/2016 | Ward, III | ............. | A61B 8/5223 |

* cited by examiner

BEAM SHARPENING RADAR SYSTEM AND METHOD

BACKGROUND

Embodiments of the inventive concepts disclosed herein generally relate to the field of radar systems, and more particularly, but not by way of limitation, to estimation of target angles within multiple overlapping radar beams within a radar system (e.g., a weather radar system).

Efforts in the past have used multiple antenna azimuth sweeps at different antenna pointing elevations, sequential sub-aperture techniques, rapid repositioning of ESA radar beams, or multiple receiver monopulse techniques to perform this function. When the target angle estimates are needed, such as in a weather radar ground clutter to weather return discrimination process, any of these techniques may be used with various performance and/or cost tradeoffs. There is a need for a low cost, low complexity, and rapid radar beam repositioning technique to support both a target angle estimation processes and to more rapidly sample a 3D radar volume of space.

SUMMARY

In one aspect, embodiments of the inventive concepts disclosed herein are directed to a method of using an airborne radar. The method includes providing a first radar beam using a full aperture of an antenna, sampling first returns using the full aperture of the antenna, and providing a second radar beam using the full aperture of the antenna. The second radar beam includes a first phase adjusted portion provided by a second portion of the radar antenna and a non-phase delayed portion provided by a third portion of the antenna. The full aperture includes the second portion and the third portion. The method also includes sampling second returns using the full aperture of the antenna.

In a further aspect, embodiments of the inventive concepts disclosed herein are directed a radar system. The radar system includes an antenna and a processor. The processor is configured to cause a first radar beam to be provided using a first portion of the radar antenna and to cause a second radar beam to be provided using a phase adjusted portion of the antenna and a remaining portion of the radar antenna. In some embodiments, the second radar has a dip.

In a further aspect, embodiments of the inventive concepts disclosed herein are directed to a radar system. The radar system includes a radar antenna having a first portion and a second portion, a feed circuit coupled to the radar antenna including a phase shifter in a path for the second portion, and a control circuit. The control circuit is configured to provide a first radar beam using the first portion and the second portion and provide a second radar beam using the first portion of the radar antenna and the second portion of the radar antenna. The second radar beam is provided using a phase adjustment provided by the phase shifter in the path for the second portion and has a response with a dip at an angle between negative and positive five degrees.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
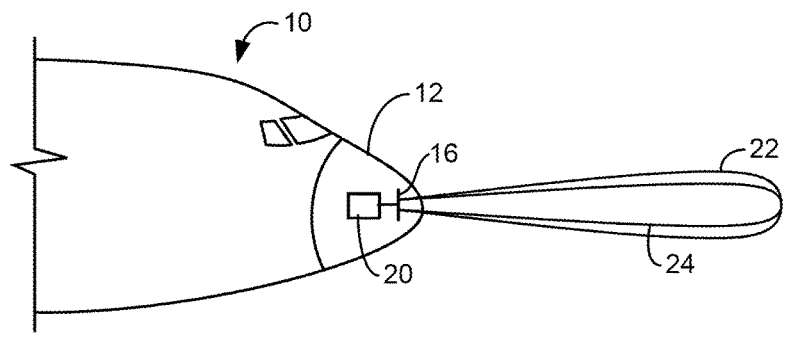
FIG. 1 is a partial side view of a nose of an aircraft including a radar system according to some embodiments.

Before describing in detail the inventive concepts disclosed herein, it should be observed that the inventive concepts disclosed herein include, but are not limited to, a novel structural combination of one or more data/signal processing components, sensors, and communications circuits, and are not limited to the particular detailed configurations thereof. Accordingly, the structure, methods, functions, control and arrangement of components, modules, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

With reference to FIG. 1, an aircraft 10 includes a nose 12. The nose 12 includes a radar antenna 16 which is part of a radar system 20. According to some embodiments, the radar system 20 is located on the top of the aircraft 10, on a wing pod, or on the tail of the aircraft 10. In some embodiments, the radar system 20 is a weather radar system and provides radar beams 22 and 24 configured for accurate angle estimation, such as elevation angle estimation. In some embodiments, part of one of the radar beams 22 and 24 is phase shifted with respect to other (e.g., a spoiled) which allows for improved correlation. The radar beams 22 and 24 are provided by a MULTISCAN radar system configured as described herein in some embodiments.

In some embodiments, the use of the spoiled beam provides improved elevation angle estimates which allow for improved identification and rejection of ground clutter and which allow for the use of smaller antennas to be used for wind shear detection. In some embodiments, one of radar beams 22 and 24 is configured as a spoiled beam which can be used for overflight detection and weather detection or wind shear detection, thereby reducing the number of beams required for overflight detection and weather or wind shear detection. In some embodiments, the spoiled beam has larger elevation coverage suitable for overflight detection. In some embodiments, the radar system 20 achieves higher loop gain relative to split aperture performance (e.g., a 4.5 decibel (dB) two way radar loop performance improvement).

In some embodiments, the radar returns (e.g., weather radar returns) received by the radar antenna 16 associated with the radar beams 22 and 24 are combined and processed to determine an angle (elevation angle) to the target. The radar beams 22 and 24 are provided sequentially and the radar returns are received sequentially in some embodiments. In some embodiments, coding is utilized so that the radar beams 22 and 24 are provided simultaneously or near simultaneously and the radar returns are received simultaneously (e.g., using parallel transmit and receive channels) or near simultaneously. In some embodiments, the power associated with the returns are subtracted logarithmically (e.g., divided) from each other and the change in power per angle is compared to a profile to determine the angle to target to estimate elevation angle (e.g., within the beam). Although described below with respect to elevation angle estimates, similar techniques can be used or azimuth angle estimates in some embodiments.

In some embodiments, the radar beam 22 is a full aperture or sum beam and the radar beam 24 is provided as a full aperture beam with half of the beam phase adjusted (e.g., 90 degree delay). The return for the radar beam 22 is received on the full aperture without a phase adjustment and the return for the radar beam 24 is received on the full aperture with or without the phase adjustment on half of the radar antenna 16 in some embodiments. Other phase adjustments and proportions of the radar antenna 16 can be used for the radar beam 24 and the return associated with the radar beam 24 in some embodiments.

The radar antenna 16 can be of various sizes and types. The radar antenna 16 is mechanically and/or electronically steerable and the radar system 20 has the capability to make phase adjustments on portions of the radar antenna 16 in some embodiments. The radar antenna 16 is a small antenna having a radius of less than sixteen inches or less than twelve inches in some embodiments. In some embodiments, the radar antenna 16 is a passive electronically steered antenna array (PESA), an active electronically steered array AESA, a mechanically steerable slotted waveguide array, parabolic antenna, or other aperture. In some embodiments, phase can be adjusted on quarter or one half portions of the antenna 16 and is configured as an avionic weather radar antenna. Radar system 20 can use software systems and computer resources for processing radar beams 22 and 24 and returns therefrom compatible with various types of antennas including AESA products and mechanically steered antennas in some embodiments.

Figure 2:
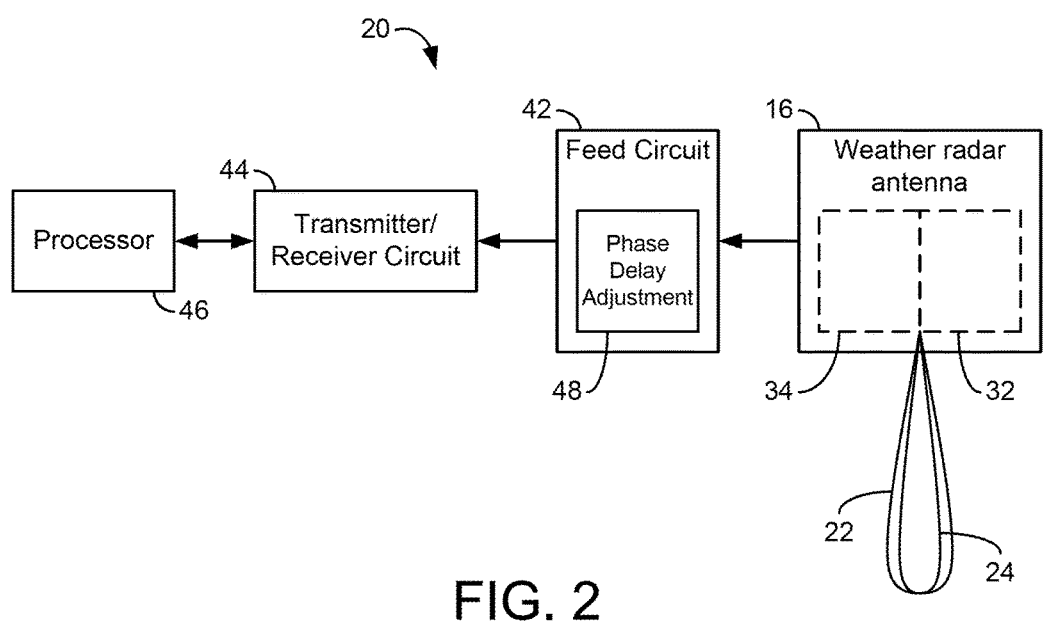
FIG. 2 is a block diagram of the radar system illustrated in FIG. 1.

Referring to FIG. 2, a block diagram of the radar system 20 is shown, according to an exemplary embodiment. The radar antenna 16 includes at least a portion 32 and a portion 34. The radar system 20 includes the radar antenna 16, a feed circuit 42, a transmitter/receiver circuit 44, and a processor 46. The feed circuit 42 is coupled between the radar antenna 16 and the transmitter/receiver circuit 44. The processor 46 is coupled to the transmitter/receiver circuit 44, provides signals for providing the radar beams 22 and 24, and receives data associated with the radar returns via the transmitter/receiver circuit 44. The feed circuit 42 includes a phase adjustment circuit 48

The radar antenna 16 under control of the processor 46 scans the terrain and/or atmosphere for targets (e.g., ground targets, aircraft targets, or weather targets). According to one exemplary embodiment, the scan is an azimuth scan at an elevation angle for estimating the terrain elevation at a specific location. Alternatively, the scans may be in one or multiple directions. Although only two portions 32 and 34 are shown, other numbers (e.g., 3, 4, 8, 16, 100, etc.) of portions 32 and 34 and various area sizes (half, quarter, thirds, tenths, hundredths, etc.) for the portions 32 and 34 are available and selectable for phase adjustments in some embodiments.

In some embodiments, the processor 46 causes the radar antenna 16 to provide the radar beams 22 and 24 using the portions 32 and 34 (e.g., the full aperture of radar return data). The processor 46 causes the phase of one of the radar beams 22 and 24 to be spoiled by providing a phase adjustment to the portion 32 or 34 via the phase adjustment circuit 48 in some embodiments. The phase adjustment circuit 48 includes active or passive phase delay circuits, such as selectable phase delay paths. In some embodiments, the amount of the phase adjustment is programmable or selectable by the processor 46. In some embodiments, the phase adjustment circuit 48 includes a switchable phase delay circuit for one of the portions 32 and 34 of the radar antenna 16. Various criteria and system parameters can be considered when choosing an appropriate phase adjustment. The phase adjustment and the sizes of the portions 32 and 34 can be chosen to achieve a particular beam shape, power characteristic, side lobe characteristic, etc.

In some embodiments, the radar return data associated with the radar beams 22 and 24 received from the transmitter/receiver circuit 44 are combined by the processor 46 and analyzed for targets (e.g., weather targets or terrain targets). The radar return data associated with the radar beams 22 and 24 are subtracted or divided from each other and the power to angle profile is compared to an expected power to angle profile. In some embodiments, changes in power versus angle of the difference are compared to a derivative of the difference profile. Other exemplary embodiments of the radar system 20 process the radar return data differently.

In some embodiments, the spoiled beam includes a null pattern and is utilized to estimate the elevation of terrain. While sweeping the antenna 16 vertically to obtain the radar response from terrain, the null pattern produces a sharp dip in return power as the null is swept past ground clutter. This narrow dip is much narrower than data produced by a normal sum beam similarly being swept vertically. Advantageously, the radar system 20 estimates a location in the swept beam where the power change (as ground clutter is swept past) is easily identified even when weather is in view.

The radar system 20 can use the split or sub-aperture techniques and components of the radar systems described in U.S. Pat. Nos. 6,741,208, 7,616,150, 7,843,380, 7,889,117, 8,558,731, and 8,773,301 incorporated herein by reference and assigned to the assignee of the present application. The type of the radar system 20 and data gathering techniques are not discussed in the specification in a limiting fashion.

Figure 3:
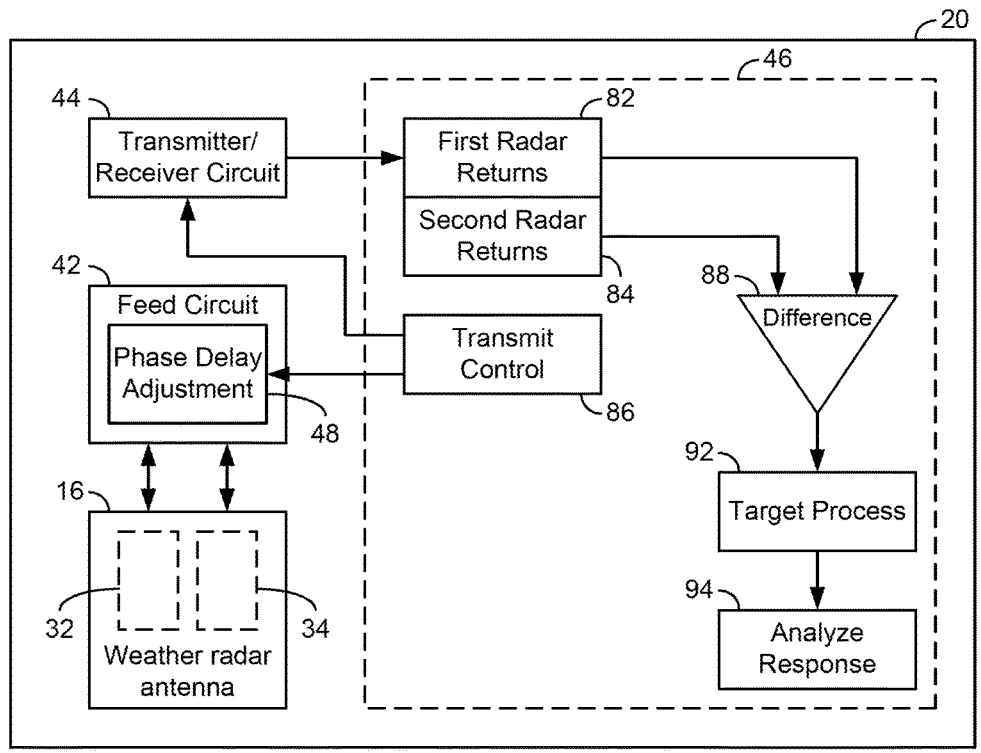
FIG. 3 is a more detailed block diagram of the radar system illustrated in FIG. 2.

With reference to FIG. 3, the processor 46 includes a return memory 82, a return memory 84, a transmit control circuit 86, a difference circuit 88, a target processing circuit 92, and an analysis circuit 94. The processor 46 stores radar return data associated with the radar beam 22 in the return memory 82 and stores radar return data associated with the radar beam 24 in the return memory 84. The radar return data from the return memories 82 and 84 are differenced in the difference circuit 88. The difference circuit 88 includes software or hardware for correlating the radar return data from the return memories 82 and 84 and determining a difference.

The target processing circuit 92 uses the difference from the difference circuit 88 to locate targets. The target processing circuit 92 can determine an elevation angle (within the beam) to each target. The analysis circuit 94 receives data from the target process circuit and determines type and presence of terrain and weather phenomena. For example, the analysis circuit 94 uses MULTISCAN radar system techniques to determine the presence of weather phenomena (e.g., analysis of power, spectral width, range, temperature, altitude, velocity, etc.). The transmit control circuit 86 provides signals to the transmitter/receiver circuit 44 and the phase adjustment circuit 48 so that the radar antenna 16 provides the radar beams 22 and 24.

The transmit control circuit 86 can provide a radar signal at the appropriate frequency, pulse repetition frequency to the antenna 16 through the feed circuit 42 and a phase control signal to the phase adjustment circuit 48. The radar signals and radar returns are in the X-band S-band, W-band or C-band in some embodiments.

The transmit control circuit 86, the difference circuit 88, the target processing circuit 92, and the analysis circuit 94 are software modules, circuits, or combinations thereof in some embodiments. The processor 46 can be, or can include one or more microprocessors, an application specific integrated circuit (ASIC), a circuit containing one or more processing components, a group of distributed processing components, circuitry for supporting a microprocessor, or other hardware configured for processing.

In some embodiments, the radar system 20 provides data representing a 120 degree field of view in accordance with a weather radar sweep. The sweep can be limited during approach to be a 30 azimuth degree sweep or be a 180 degree sweep in some embodiments. Various types of sweeps, sweep patterns, and sweep speeds can be utilized without departing from the scope of the embodiments disclosed herein.

Figure 4:
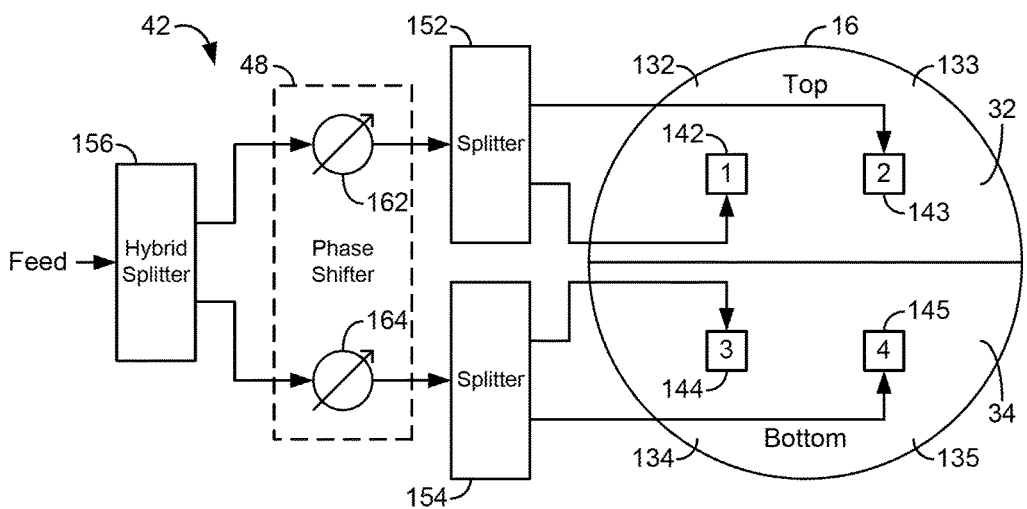
FIG. 4 is a more detailed block diagram of an embodiment of a feed network and an antenna for the radar system illustrated in FIG. 2.

With reference to FIG. 4, the radar antenna 16 can be configured to include the portion 32 including top quarter portions 132 and 133 and the portion 34 including bottom quarter portions 134 and 135 in some embodiments. The portions 132, 133, 134, and 135 receive radar signals from the feed circuit 42 via ports 142, 143, 144, and 145. In some embodiments, two additional phase shifters are added, so there are four phase shifters, one per quadrant, thereby allowing beam spoiling both in elevation and azimuth. The feed circuit 42 includes the phase adjustment circuit 48, a splitter 152, a splitter 154, and a splitter 156. The phase adjustment circuit 48 includes a phase splitter 162 and a phase splitter 164. The feed circuit 42 include separate transmit and receive paths or bidirectional transmit/receive paths in some embodiments. The feed circuit 42 is described below as including a unidirectional transmit path. In some embodiments, where the radar antenna 16 includes the portions 32 and 34 without sub portions, two phase shifters can be reduced to one phase shifter against a fixed reference path. Phase shifters can similarly be reduce to two phase shifters against a fixed elevation reference path and a fixed azimuthal reference path. In some embodiments, the radar antenna 16 is configured for both azimuth and elevation phase shift based beam sharpening (e.g., configured to provide a phase shift to portions 132 and 134 without providing a phase shift to portions 133 and 135).

The splitter 156 receives the radar signal for the radar beams 22 and 24 and provides two versions of the radar signal to the phase adjustment circuit 48. The splitter 156 receives the radar signal for the radar beam 22 followed by the radar signal for the radar beam 24 from the transmitter/receiver circuit 44 (FIG. 3) in some embodiments. Radar beams are created at the output of the splitter 156 by combining the returns from the top and bottom halves of the antenna 16. One beam is for no differential phase shift and one beam is for the differential phase shift. Either in-phase or 90 hybrid splitters can be used The processor 46 sets the phase adjustment to a first setting using phase shifters 162 and 164 for the radar beam 22 and the radar antenna 16 transmits the radar beam 22 using all four portions 132, 133, 134, and 135. The portions 132, 133, 134, and 135 receive four versions of the radar signals provided by the splitters 152 and 154 via ports 142, 143, 144, and 145 in some embodiments. The radar antenna 16 can include switches controlled by the processor 46 for selecting portions 132, 133, 134, and 135. The processor 46 sets the phase adjustment to a first setting for receiving the radar return associated with radar beam 22 using all four portions 132, 133, 134, and 135. The processor 46 sets the phase adjustment to the first setting for portions 132 and 133 using the phase shifter 162 and sets the phase adjustment to a second setting for portions 134 and 135 using the phase shifter 164 for the radar beam 24. The portions 132 and 133 receive two versions of the radar signal provided by the splitter 152 via ports 142 and 143, and the portions 134 and 135 receive two versions of the radar signal provided by the splitter 154 via ports 144 and 145 in some embodiments. The radar antenna 16 transmits the radar beam 24 using all four portions 132, 133, 134, and 135. The processor 46 sets the phase adjustment to the first setting for receiving the radar return associated with radar beam 24 using all four portions 132, 133, 134, and 135 in some embodiments. The processor 46 sets the phase adjustment to the first setting and sets the phase adjustment to the second setting for receiving the radar return associated with radar beam 24 using all four portions 132, 133, 134, and 135 in some embodiments.

Figure 5:
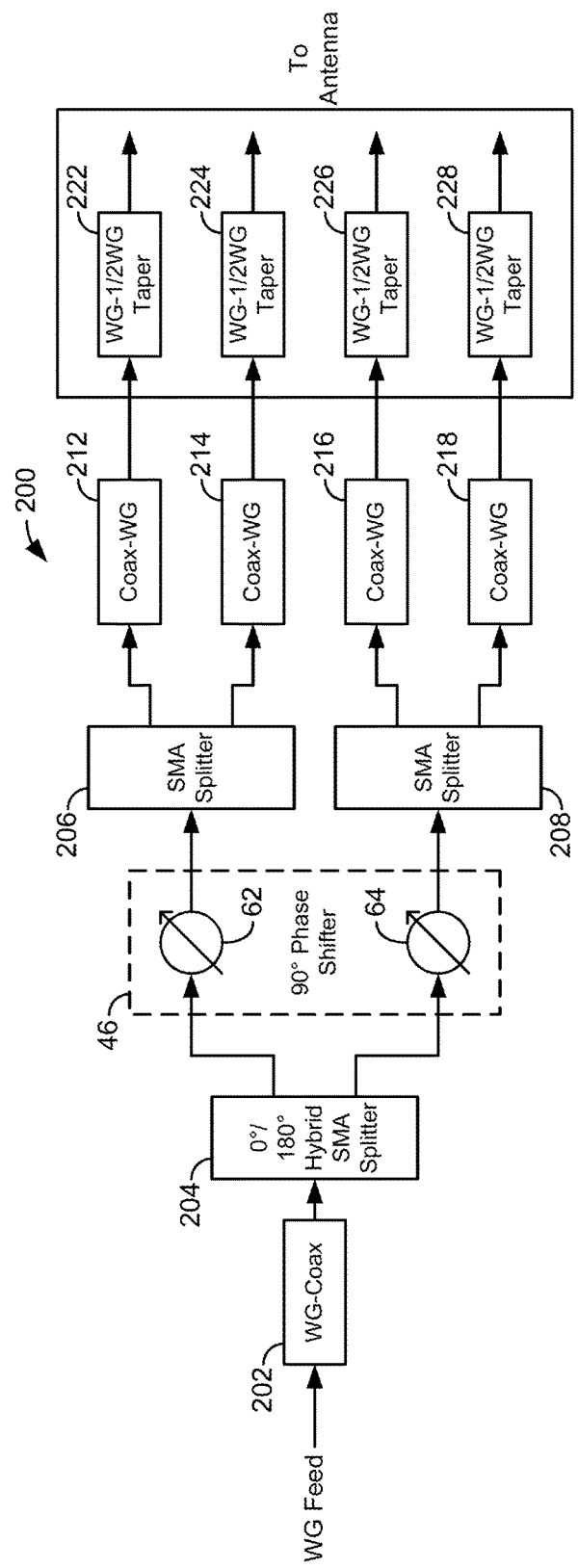
FIG. 5 is a more detailed block diagram of an embodiment of a network including waveguide and coaxial paths for the radar system illustrated in FIG. 2.

With reference to FIG. 5, a waveguide feed circuit 200 can be used as feed circuit 42 and includes a waveguide to coaxial converter 202, a 0/90/180 degree hybrid subminiature version A (SMA) splitter 206, phase adjustment circuit 48 including phase splitters 162 and 164, a SMA splitter 206, a SMA splitter 208, a coaxial to waveguide converter 212, a coaxial to waveguide converter 214, a coaxial to waveguide converter 216, a coaxial to waveguide converter 218. The SMA connectors are not required. Coaxial to waveguide converters 212, 214, 216, and 218 are coupled to respective waveguide to ½ waveguide tapers 222, 224, 226, and 228 which are coupled to respective ports 142, 143, 144, and 145 of the radar antenna 16 (FIG. 4) embodied as a waveguide aperture in some embodiments. The waveguide tapers are not required in some embodiments. The waveguide feed circuit 200 is implemented in waveguide technologies for minimal loss, in printed circuit board technologies for lowest cost, or in hybrid waveguide/printed circuit board technologies in some embodiments.

Figure 6:
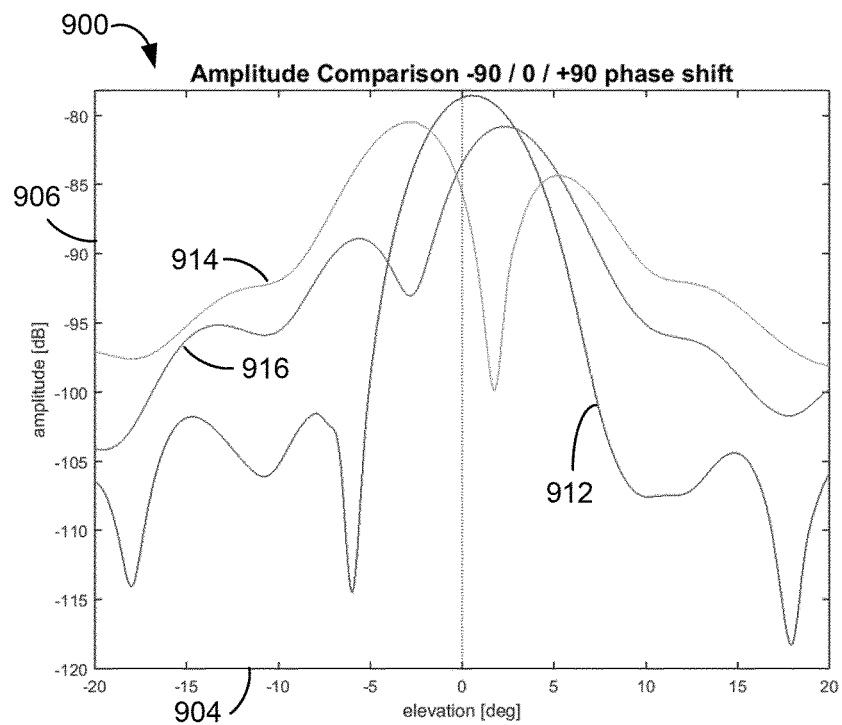
FIG. 6 is a graph showing beam power versus elevation angles for first, second and third drive states.

With reference to FIG. 6, a chart 900 includes an X axis 904 representing elevation angle with respect to boresight of the antenna, a Y axis 906 representing amplitude in dB, a line 912 representing the antenna beam when the antenna 16 is unshifted, a line 914 representing the antenna beam when the antenna 16 is shifted in a top half (e.g., 90 degrees) and unshifted in a bottom half, and a line 916 representing the antenna beam when the antenna 16 is shifted in a bottom half (e.g., 90 degrees) and unshifted in a top half. The response represented by the line 916 is shifted up in elevation when compared to the unshifted response associated with the line 912, and the response represented by the line 914 is shifted down in elevation when compared to the unshifted response associated with the line 912 according to some embodiments. The responses represented by the lines 912, 914, and 916 are nearly frequency independent in a range between 9.43 GHz and 9.49 GHz in some embodiments. The line 912 has a beam peak at 0.57 degrees, the line 914 has a beam peak at −2.86 degrees, and the line 916 has a beam peak at 2.32 degrees in some embodiments. The responses associated with the lines 914 and 916 include dips at angles of approximately negative 5 (e.g., 2-3) degrees and positive 5 (e.g., 2-3) degrees, respectively. Different responses and beam skew are possible using different relative phase shifts.

Figure 7:
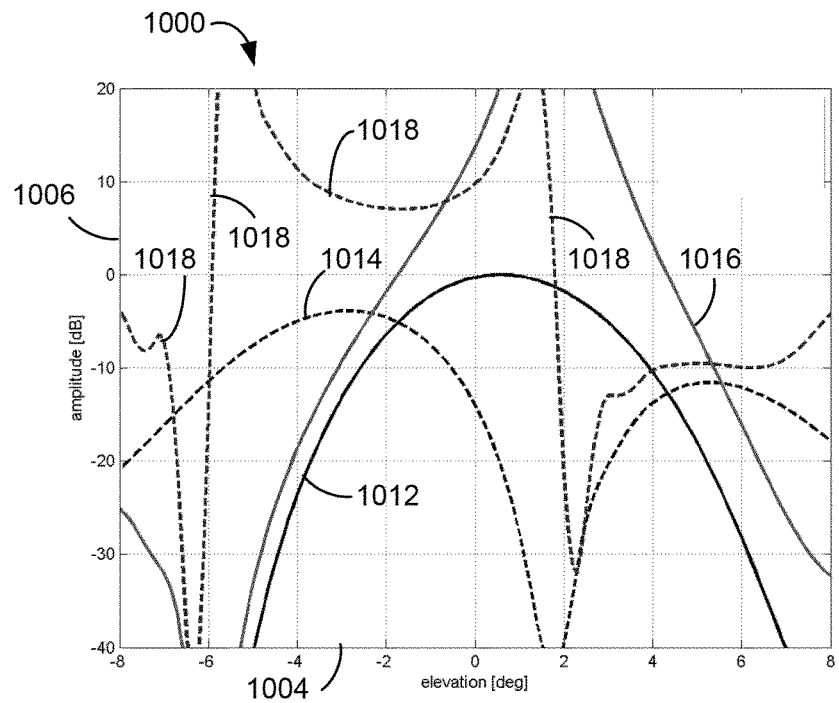
FIG. 7 is a graph showing beam power versus elevation angles for a sum beam, a shifted beam, a difference between the sum beam and the shifted beam, and a derivative of the difference beam for the radar system illustrated in FIG. 2 according to some embodiments.

With reference to FIG. 7, a chart 1000 includes an X axis 1004 representing elevation angle with respect to boresight of the antenna, a Y axis 1006 representing amplitude in dB, a line 1012 representing the antenna beam when the antenna 16 is unshifted, a line 1014 representing the antenna beam when the antenna 16 is shifted in a top half (e.g., 90 degrees) and unshifted in a bottom half, a line 1016 representing a difference between the antenna beam of line 1012 and the antenna beam of line 1014, and a line 1018 representing a derivative with respect to elevation angle of the difference between the antenna beam of line 1012 and the antenna beam of line 1014 in some embodiments. The large power to angle response of the derivative provides increased sensitivity for target elevation determinations as shown by the line 1018.

Figure 8:
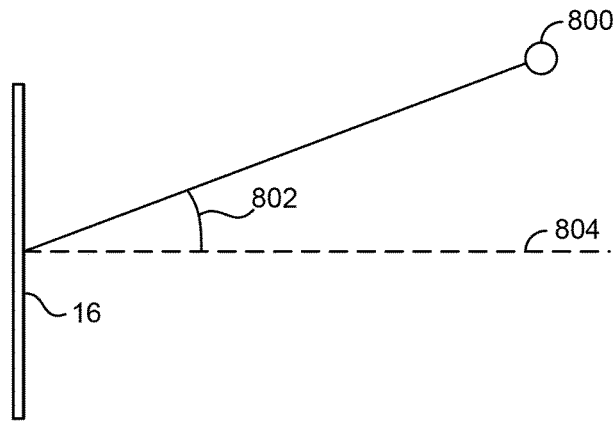
FIG. 8 is a schematic diagram showing an angle to target for the radar system illustrated in FIG. 2 according to some embodiments.

With reference to FIG. 8, a target 800 is disposed at an angle to target 802 associated with a boresight angle 804 of the antenna 16. The bore sight angle 802 can be provided at various tilt angles associated with the antenna 16.

Figure 9:
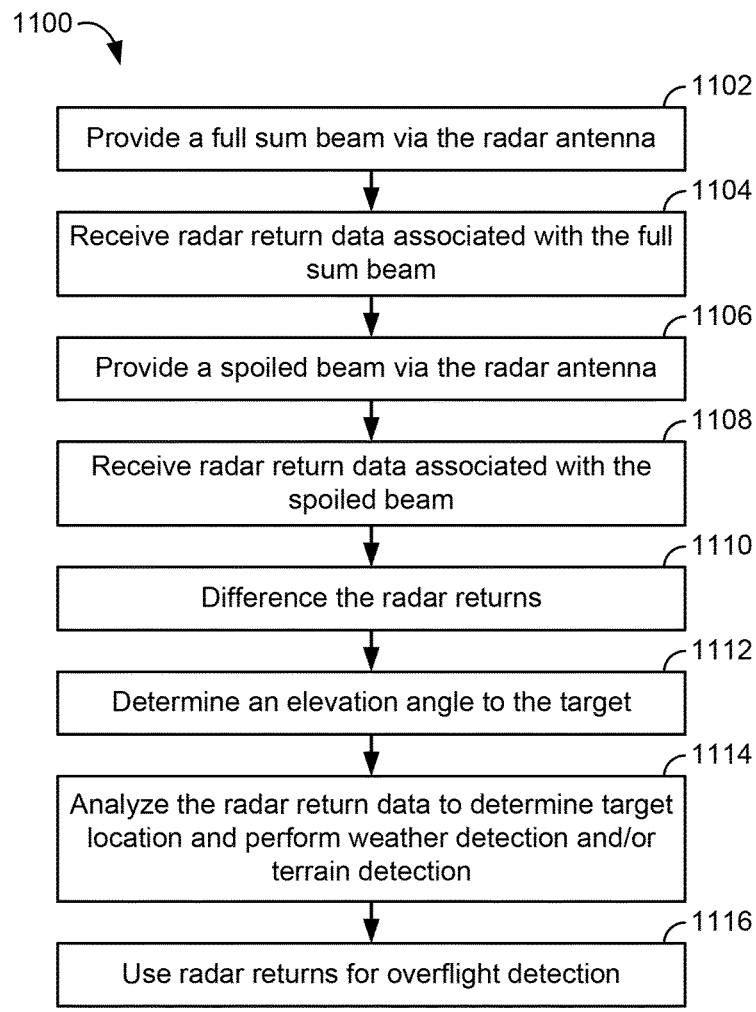
FIG. 9 is a flow diagram showing operations of the radar system illustrated in FIG. 2 according to some embodiments.

With reference to FIG. 9, the processor 46 or other computing platform can execute a flow 1100 to sense elevation of terrain, obstacles, runways, runway features, asphalt, or weather phenomena using the radar system 20 according to some embodiments. At an operation 1102, the radar system 20 provides a full sum beam via the radar antenna 16. At an operation 1104, the radar system 20 receives a radar return associated with the full sum beam via the radar antenna 16 and stores radar return data associated with the full sum beam. The radar return data of the operation 1104 can include information about weather conditions, terrain, obstacles, or any combination thereof.

At an operation 1106, the radar system 20 provides a spoiled beam via the radar antenna 16. The spoiled beam is provided by adjusting the phase (e.g., by 90 degrees) of a portion (one half) of the radar antenna 16 in some embodiments. The spoiled beam can be configured to either look downward or upward. At an operation 1108, the radar system 20 receives a radar return associated with the spoiled beam via the radar antenna 16 and stores radar return data associated with the spoiled beam. The return path associated with the antenna 16 can include the phase adjustment of the operation 1106 in the operation 1108 or the phase adjustment can be removed or changed in the operation 1108. The radar return data of the operation 1108 can include information about weather conditions, terrain, obstacles, or any combination thereof.

At an operation 1110, the radar system 20 takes a difference or divides the radar returns from the operation 1104 and 1108. The radar returns can be differenced in a variety of ways. In some embodiments, the radar returns are spatially correlated with respect to each other and the power at each location or bin is logarithmically subtracted from each other to determine the difference. In some embodiments, the radar returns are represented by polynomial expressions. The radar system 20 uses the difference to determine the elevation (within the beam) to a target in an operation 1112. If changes in elevation angle per angle are larger, it increases sensitivity to determine target elevation.

The radar system 20 uses the difference (e.g., line 1016 in FIG. 7) to determine the angle to target 802 (FIG. 8) in the antenna plane of the spoiling of the beam in some embodiments. In some embodiments the radar system 20 can determine the elevation of the target taking into account the attitude of the antenna 16. A coordinate transformation from antenna coordinates to the horizontal plane coordinates can be used. According to one example, the antenna 16 is spoiled in the vertical plane and the antenna 16 has no roll so the angle to target and the tilt angle of the antenna 16 can be added to determine the elevation angle to the target. The elevation angle to the target is the elevation angle with respect to the horizon, not to be confused with the elevation angle with respect to the boresight of the antenna.

At an operation 1114, the radar system 20 analyzes the radar return data to determine target location and perform weather detection and/or terrain detection. At an operation 1106, the radar return data from the operation 1108 is used for overflight detection. The larger elevation coverage of the spoiled beam makes such radar return data appropriate for overflight detection without requiring additional beams in some embodiments.

Figure 10:
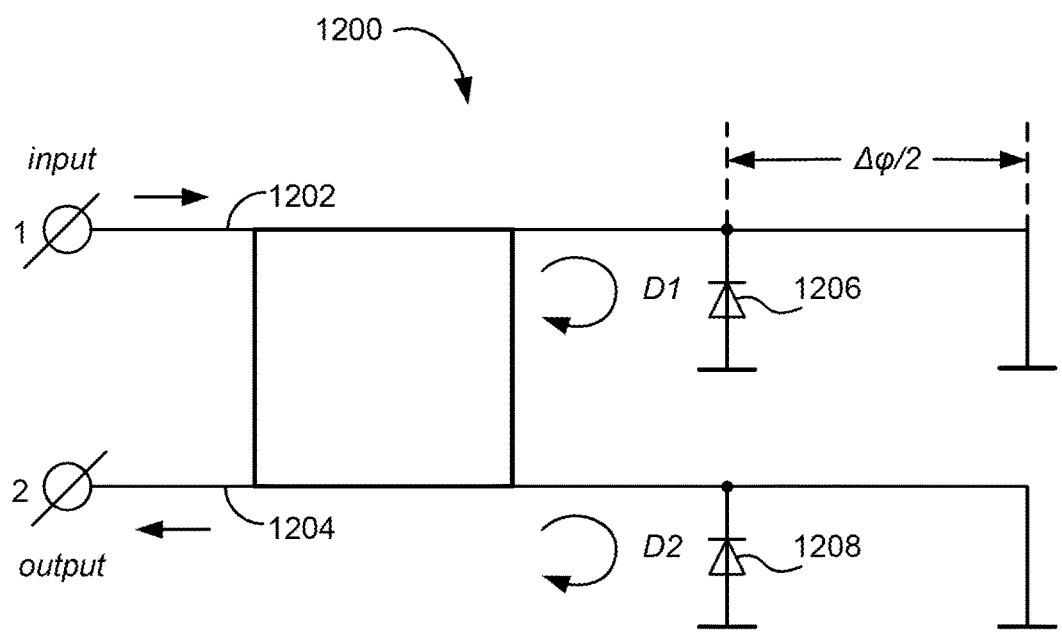
FIG. 10 is a block diagram of a phase shifter for use in the feed network illustrated in FIG. 5.

With reference to FIG. 10, a phase shifter 1200 can be utilized in the radar system 20 (e.g., as phase shifter 162 or 164 in FIG. 4). In some embodiments, the phase shifter 1200 is embodied as a quadrature divider/combiner, a branch line 90 degree coupler, or a rat race coupler. The phase shifter 1200 includes an input 1202, an output 1204, and diode switches 1206 and 1208. Diode switches 1206 and 1208 can be used to control the phase delay through the phase shifter 1200. In some embodiments, the diode switches 1206 and 1208 are PIN diodes, switching transistors, MEMS switches, or any RF switching device.

In some conventional phase shifters, when a switch experiences a catastrophic failure and is stuck in the off state, a full aperture mode of operation required for MULTISCAN modes of operation is not available, thus making the entire radar system fail. Advantageously, the phase shifter 1200 can be configured such that its failure mode provides a full aperture radiation pattern for traditional (dual-mechanical sweep) operation. This failure mode can be a back-up or go home mode for the radar system 20. The back mode enables an extremely high mean time between failure (MTBF), reliability, availability, dispatchibility, etc. for the radar system 20 based on this disclosure.

The radar system 20 using the processor 45 can sense a failure mode associate with the phase shifter 1200. The most common failure modes for the switching diodes 1206 and 1208 are shorted junctions. When one of the switching diodes 1206 shorts, the other switching diode 1208 is protected. This creates an offset in the phase shifter 1200 that would result in higher insertion loss.

This failure state is detectable during the reveres bias state on the power supply because current is drawn in the failure mode where in un-failed mode there is no current draw. When the current draw is detected during the reverse bias state, the power supply can hard forward bias the switching diodes 1206 and 1208, blowing the switching diode 1208 to a short to match the state of the initially blown switching diode 1206. This results in a failure mode which has a fixed phase shift with lowest possible insertion loss and would allow the radar system 20 to continue to operate as normal without phase shifting.

For the dual phase shifter feed case, as shown in FIG. 5, the failure mode with the fixed phase state provides the same pattern that is used in normal weather and mechanically scanned MULTUISCAN modes(e.g., according to the methodology discussed with reference to FIG. 10 (an antenna beam associated with the line 1012)). The radiation pattern allows the radar system 20 to operate in a full-aperture mode during failure of the phase shifter 1200 which is adequate for normal MULTISCAN radar system modes of operation. Since the phase shifter's failure mode for both phase shifters is identical, each feed path will experience the same loss and phase shifter to the first order. This balance phase and amplitude scenario will result in a low side lobe radiation pattern.

For the single phase sifter feed embodiment (similar to the feed of FIG. 5) operation in this failure mode with the fixed phase state provides the same pattern that is used in the single sweep MULTUISCAN methodology discussed with reference to FIG. 10 (an antenna beam associated with the line 1014). The radiation pattern is provided in a worst case scenario, thereby allowing the radar system 20 to operate in a full-aperture mode during failure of the phase shifter 1200 which is adequate for normal MULTISCAN radar system modes of operation In some embodiments, the amount of beam pointing squint is determined a priority and is stored as a motion control offset command for the radar antenna 16 during the failure mode. Beam dithering, and other radar processing algorithms can be used to mitigate the effects of the higher side lobe of the failure mode.

Although specific steps are shown and described in a specific order, it is understood that the method may include more, fewer, different, and/or a different ordering of the steps to perform the function described herein. Flow 1100 can be implemented in software on a computing platform associated with a weather radar system, a TAS, or other aviation device. Flow 1100 is implemented on a weather radar computing platform such as an RDR 4000, MULTISCAN, or WXR-2100 system.

The exemplary embodiments and representations illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using a computer processor, or by a special purpose computer processor incorporated for this or another purpose or by a hardwired system.

As noted above, embodiments within the scope of the inventive concepts disclosed herein include program products comprising non-transitory machine-readable media for carrying or having machine-executable instructions or data structures stored thereon. Such machine-readable media may be any available media that may be accessed by a computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a computer or other machine with a processor. Thus, any such a connection is properly termed a machine-readable medium. Combinations of the above are also included within the scope of machine-readable media. Machine-executable instructions comprise, for example, instructions and data which cause processor to perform a certain function or group of functions.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc., that perform particular tasks or implement particular data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A method of using an airborne radar, the method comprising:
   providing a first radar beam using a full aperture of a radar antenna;
   sampling first returns using the full aperture of the radar antenna;
   providing a second radar beam using the full aperture of the radar antenna, wherein the second radar beam is comprised of a phase adjusted portion provided by a first portion of the radar antenna and a non-phase adjusted portion provided by a second portion of the radar antenna; and
   sampling second returns using the full aperture of the radar antenna;
   providing difference data using the first returns and the second returns;

providing derivative data using the difference data, wherein the derivative data is with respect to a power to angle response and provides increased sensitivity for target elevation angle determinations.

2. The method of claim 1 further comprising:
processing the derivative data resulting from the difference data associated with the first and second returns to determine an angle to a target.

3. The method of claim 1 wherein the difference data is a result of the first returns subtracted by the second returns.

4. The method of claim 1 wherein the derivative data is with respect to an elevation angle of the difference data.

5. The method of claim 1 further comprising:
detecting weather phenomena using the difference data.

6. The method of claim 1 wherein the first portion and the second portion are half apertures.

7. The method of claim 1 wherein the phase adjusted portion provides a phase adjustment ranging between 0 and 180 degrees.

8. The method of claim 1 wherein the second radar beam is a spoiled beam providing a shift of a beam center.

9. A radar system, comprising:
a radar antenna; and
a processor coupled with the radar antenna and configured to cause a first radar beam to be provided using a first portion of the radar antenna, and a second radar beam to be provided using a phase adjusted portion of the radar antenna and a remaining portion of the radar antenna, the second radar beam has a shifted beam center with respect to the first radar beam, wherein both the first portion and the phase adjusted portion combined with the remaining portion are a full aperture, and wherein the processor is configured to receive first returns associated with the first radar beam using the first portion and receiving second returns associated with the second radar beam using the first portion, to provide difference data using the first returns and the second returns, and to provide derivative data using the difference data, wherein the derivative data is with respect to a power to angle response and provides increased sensitivity for target angle determinations.

10. The radar system of claim 9 wherein the first portion being unadjusted in phase when receiving the second returns.

11. The radar system of claim 9 wherein the processor is configured to receive the first returns associated with the first radar beam using the first portion without phase adjustments and receive second returns associated with the second radar beam using the first portion, the first portion including the phase adjusted portion of the radar antenna and the remaining portion when receiving the second returns.

12. The radar system of claim 11 wherein the second radar beam has a maximum in one of a first range of zero to negative five degrees and a second range of zero and positive five degrees and a dip in the other of the first range and the second range.

13. The radar system of claim 12 wherein the derivative data is with respect to an elevation angle of the difference data.

14. The radar system of claim 13 wherein the processor is configured to compare the difference of the power of the first returns and the second returns to determine an angle to a target.

15. The radar system of claim 9 wherein the phase adjusted portion is adjusted in between 0 and 180 degrees and is a top half or a bottom half of the radar antenna.

16. A radar system, comprising:
a radar antenna having at least a first portion and a second portion;
a feed circuit coupled to the radar antenna comprising a phase shifter in a path for the second portion; and
a control circuit configured to provide a first radar beam using the first portion and the second portion of the radar antenna and provide a second radar beam using the first portion of the radar antenna and the second portion of the radar antenna, wherein the second radar beam is provided using a phase adjustment provided by the phase shifter in the path for the second portion and has a shifted beam center with respect to the first radar beam, wherein the control circuit is configured to receive first returns from the first radar beam on the first portion and the second portion, wherein the control circuit is configured to receive second returns from the second radar beam on the first portion and the second portion, the first portion and the second portion being a full aperture of the radar antenna, wherein the control circuit is configured to provide difference data using the first returns and the second returns and to provide derivative data using the difference data, wherein the derivative data is with respect to a power to angle response and provides increased sensitivity for target angle determinations.

17. The radar system of claim 16, wherein the control circuit is configured to determine an angle to target using the derivative data.

18. The radar system of claim 17, wherein the angle to target is used to determine an elevation angle to a target.

19. The radar system of claim 16, wherein the control circuit is configured to sense a failure of a first component in the phase shifter and disables a second component in the phase shifter in response to the failure.

20. The radar system of claim 16, wherein the second radar beam is used for overflight detection.

* * * * *